US010752080B1

(12) United States Patent
Kroyer et al.

(10) Patent No.: US 10,752,080 B1
(45) Date of Patent: Aug. 25, 2020

(54) CANOPY DOWNDRAFT FAN ASSEMBLY

(71) Applicant: SPORTECH, INC., Elk River, MN (US)

(72) Inventors: Grayson Kroyer, Corcoran, MN (US); Mario Negri, Hopkins, MN (US); Marc McCauley, Elk River, MN (US)

(73) Assignee: SPORTECH, LLC, Elk River, MN (US)

( * ) Notice: Subject to any disclaimer, the term of this patent is extended or adjusted under 35 U.S.C. 154(b) by 63 days.

(21) Appl. No.: 16/121,044

(22) Filed: Sep. 4, 2018

(51) Int. Cl.
| | |
|---|---|
| *B60H 1/00* | (2006.01) |
| *B62D 33/06* | (2006.01) |
| *F04D 29/56* | (2006.01) |
| *B60R 7/04* | (2006.01) |
| *F04D 25/16* | (2006.01) |
| *B60H 1/34* | (2006.01) |
| *F04D 29/64* | (2006.01) |

(52) U.S. Cl.
CPC ..... *B60H 1/00378* (2013.01); *B60H 1/00564* (2013.01); *B60H 1/3414* (2013.01); *B60R 7/04* (2013.01); *B62D 33/0617* (2013.01); *F04D 25/166* (2013.01); *F04D 29/563* (2013.01); *F04D 29/646* (2013.01)

(58) Field of Classification Search
CPC ............ B60H 1/00378; B60H 1/00564; B60H 1/3414; B60R 7/04; F04D 25/166; F04D 29/563; F04D 29/646
See application file for complete search history.

(56) References Cited

U.S. PATENT DOCUMENTS

| | | | | |
|---|---|---|---|---|
| 6,202,394 | B1* | 3/2001 | Russ | A01D 34/001 180/84 |
| 8,262,149 | B1* | 9/2012 | Russ | B60H 1/00407 296/102 |
| 2006/0188776 | A1* | 8/2006 | Aker | H01M 2/1077 429/120 |
| 2012/0309281 | A1* | 12/2012 | Russ | B62D 25/06 454/136 |
| 2013/0157555 | A1* | 6/2013 | Russ | B62D 25/06 454/143 |
| 2014/0265426 | A1* | 9/2014 | Russ | B60H 1/00407 296/102 |
| 2018/0317383 | A1* | 11/2018 | Bryant | A01D 75/20 |
| 2019/0241041 | A1* | 8/2019 | Russ | B62D 25/06 |

* cited by examiner

*Primary Examiner* — Lori L Lyjak
(74) *Attorney, Agent, or Firm* — Dicke, Billig & Czaja, PLLC

(57) ABSTRACT

A canopy downdraft fan assembly for being able to direct air flow like a curtain as selected. The canopy downdraft fan assembly includes a canopy assembly including support members adapted to be mounted upon a prime mover and including a canopy mounted upon the support members; and an air flow generating assembly in communication with the canopy assembly and including fans.

16 Claims, 3 Drawing Sheets

CANOPY DOWNDRAFT FAN ASSEMBLY

BACKGROUND OF THE INVENTION

Field of the Invention

The present invention relates to fans and more particularly pertains to a new canopy downdraft fan assembly for being able to direct air flow like a curtain as selected.

Description of the Prior Art

The use of fans is known in the prior art. More specifically, fans heretofore devised and utilized are known to consist basically of familiar, expected and obvious structural configurations, notwithstanding the myriad of designs encompassed by the crowded prior art which have been developed for the fulfillment of countless objectives and requirements.

The prior art describes a canopy mounted to a vehicle and having an opening in the canopy with a flange circumscribed in the opening with the downdraft fan supported in the opening with the flange overlying, a perimeter of the fan. Another prior art includes a roof cap vertically offset above the canopy with a side air intake port and with the downdraft fan supported by the canopy. Also, another prior art includes a downdraft fan attached to the vehicle and a canopy mounted upon the fan. Further, another prior art includes a roll bar assembly with tubular frame members having an opening with a flange circumscribed in the opening and with the downdraft fan mounted to the frame members and a canopy having an opening and being mounted to the flange. While these devices fulfill their respective, particular objectives and requirements, the aforementioned patents do not disclose a new canopy downdraft fan assembly.

SUMMARY OF THE INVENTION

The general purpose of the present invention, which will be described subsequently in greater detail, is to provide a new canopy downdraft fan assembly which has many of the advantages of the fans mentioned heretofore and many novel features that result in a new canopy downdraft fan assembly which is not anticipated, rendered obvious, suggested, or even implied by any of the prior art fans, either alone or in any combination thereof. The present invention includes a canopy assembly including support members adapted to be mounted upon a prime mover and including a canopy mounted upon the support members; and an air flow generating assembly in communication with the canopy assembly and including fans. None of the prior art includes the combination of the elements of the present invention.

There has thus been outlined, rather broadly, the more important features of the canopy downdraft fan assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new canopy downdraft fan assembly which has many of the advantages of the fans mentioned heretofore and many novel features that result in a new canopy downdraft fan assembly which is not anticipated, rendered obvious, suggested, or even implied by any of the prior art fans, either alone or in any combination thereof.

Still another object of the present invention is to provide a new canopy downdraft fan assembly for being able to direct air flow like a curtain as selected.

Still yet another object of the present invention is to provide a new canopy downdraft fan assembly that is effective and efficient in directing air flow as desired by the user.

Even still another object of the present invention is to provide a new canopy downdraft fan assembly where the fans are positioned to be more effective and useful.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
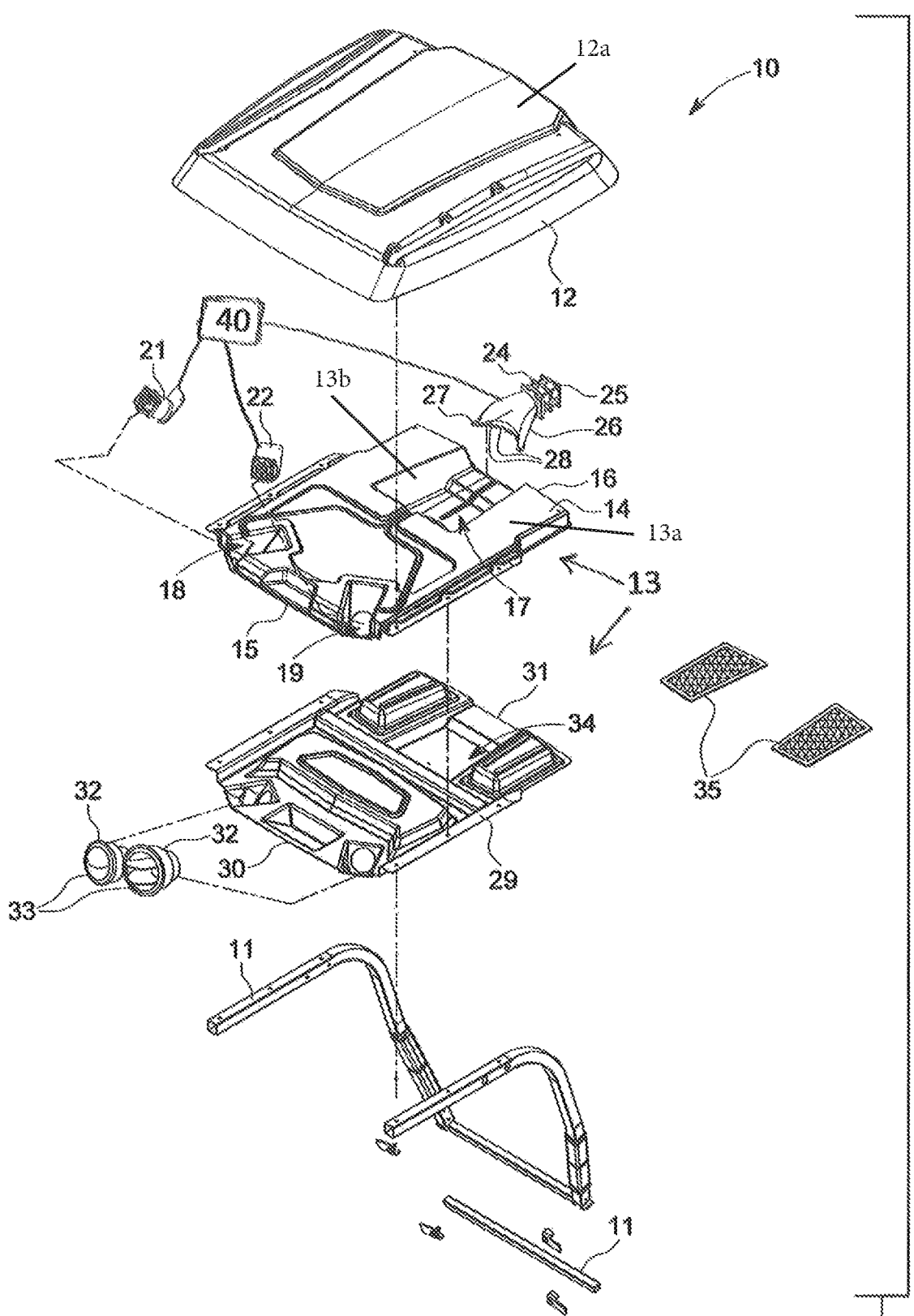
FIG. 1 is an exploded top perspective view of a new canopy downdraft fan assembly according to the present invention.
Figure 2:
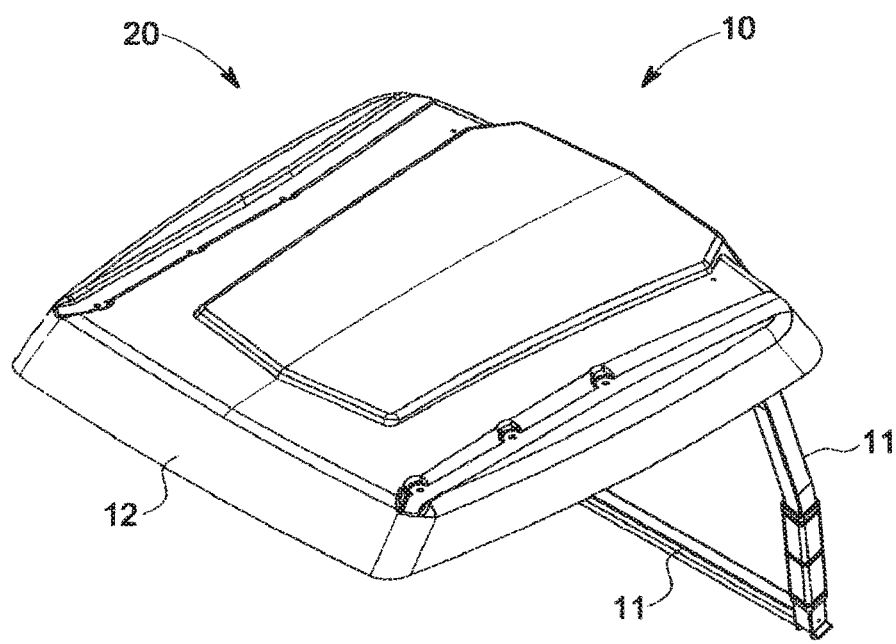
FIG. 2 is a top perspective view of the present invention.
Figure 3:
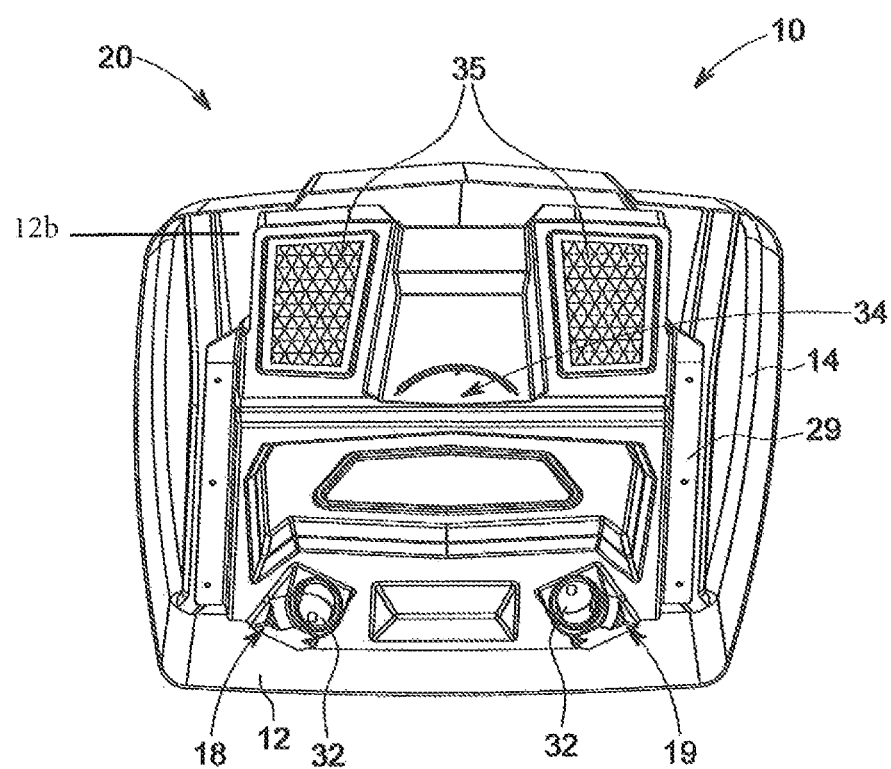
FIG. 3 is a bottom perspective view of the present invention.

With reference now to the drawings, and in particular to FIGS. 1 through 3 thereof, a new canopy downdraft fan assembly embodying the principles and concepts of the present invention and generally designated by the reference numeral 10 will be described.

As best illustrated in FIGS. 1 through 3, the canopy downdraft fan assembly 10 generally comprises a canopy assembly 20 including support members 11 adapted to be mounted upon a prime mover and including a canopy 12 having a top surface 12a and a bottoms surface 12b. Canopy 12 is conventionally mounted upon the support members 11 and also comprises an air flow generating assembly 13, which is connected to the bottom surface 12b of canopy 12 and is completely covered by top surface 12a.

The air flow generating assembly 13 includes a fan support member 14 conventionally attached to and depending from bottom surface 12b of the canopy 12 with the fans 21-22, 24-25 conventionally supported by the fan support member 14. The air flow generating assembly 13 further includes a vent support member 29 conventionally attached to and depending from the fan support member 14 with vents 32 spaced apart and in flow communication with the fan support member 14. The fan support member 14 is a sheet of rigid material having a front end 15, a back end 16 and top surface 13a. Intermediate the front and back ends 15, 16, the sheet of rigid material includes a recess 13b configured with an opening 17 through the rigid material that is spaced from the top surface 13a. Fan support member 14 further has recessed ports 18, 19 spaced apart relative to one another and spaced from the top surface 13a and disposed through fan support member 14 proximate to the front end 15. The fans 21-22, 24-25 are conventionally mounted to the rigid sheet of material of the fan support member 14 and are conventionally connected to a power source 40. Port fans 21, 22 are each securely and conventionally disposed in a respective one of the ports 18, 19. Fan members 24, 25 are conventionally mounted proximate to the back end 16 of the sheet of rigid material of the fan support member 14. The air flow generating assembly 13 also includes a chute or plenum 26 conventionally coupled to the fan members 24, 25 and having an open distal end 27 with adjustable slats 28 spaced apart and conventionally disposed at the open distal end 27 for directing air flow created by the fan members 24, 25. The fan members 24, 25 include a pair of axial fans conventionally coupled end to end for generating greater air flow.

The vent support member 29 is a sheet of rigid material having a front end 30 and a back end 31, and also having an opening 34 disposed therethrough intermediate of the front and back ends 30, 31. The vents 32 are spaced apart and disposed therethrough proximate to the front end 30. The vents 32 are aligned with the ports 18, 19 and each of the vents 32 has adjustable louvers 33 conventionally disposed therein for selective directional flow of air generated by the port fans 21, 22. The opening 34 through the vent support member 29 is aligned with the opening 17 through the fan support member 14. The distal end 27 of the chute 26 is positioned to direct air flow through the openings 17, 34 of the fan and vent support members 14, 29. In addition cargo nets 35 securely and conventionally depend from the vent support member 29 proximate to the back end 31 of the vent support member 29 for storage.

In use, the user riding on the prime mover such as a tractor can adjust the louvers 33 and the slats 28 to direct the air flow generated from the fans 21-22, 24-25 like curtains of air flow onto oneself rather than the airflow being random to keep oneself cool during the use of the prime mover.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the canopy downdraft fan assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A canopy downdraft fan assembly comprising:
a canopy assembly including support members adapted to be mounted upon a prime mover and including a canopy mounted upon the support members the canopy having a top surface and a bottom surface; and
an air flow generating assembly beneath and covered by the canopy, the air flow generating assembly comprising a fan support member connected to the bottom surface of the canopy and a vent support member connected to and depending from the fan support member, the fan support member including a plurality of fans supported by the fan support member, the vent support member having vents spaced apart and in flow communication with the fans of the fan support member.

2. The canopy downdraft fan assembly as described in claim 1, wherein the fan support member is a sheet of rigid material having a front end and a back end, and also having an opening disposed therethrough intermediate of the front and back ends, and further having ports spaced apart and disposed therethrough proximate to the front end.

3. The canopy downdraft fan assembly as described in claim 2, wherein the fans are mounted to the sheet of rigid material and include port fans each securely disposed in a respective one of the ports and also include fan members mounted proximate to the back end of the sheet of material.

4. The canopy downdraft fan assembly as described in claim 3, wherein the air flow generating assembly also includes a chute or a plenum coupled to the fan members and having an open distal end with adjustable slats spaced apart and disposed at the open distal end for directing air flow created by the fan members.

5. The canopy downdraft fan assembly as described in claim 4, wherein the fan members include a pair of axial fans coupled end to end.

6. The canopy downdraft fan assembly as described in claim 5, wherein the vent support member is a sheet of rigid material having a front end and a back end, and also having an opening disposed therethrough intermediate of the front and back ends.

7. The canopy downdraft fan assembly as described in claim 3, wherein the vents are spaced apart and disposed therethrough proximate to the front end.

8. The canopy downdraft fan assembly as described in claim 7, wherein the vents are aligned with the ports and each of the vents has adjustable louvers disposed therein for selective directional flow of air generated by the port fans.

9. The canopy downdraft fan assembly as described in claim 6, wherein the opening through the vent support member is aligned with the opening through the fan support member.

10. The canopy downdraft fan assembly as described in claim 9, wherein the distal end of the chute is positioned to direct air flow through the openings of the fan and vent support members.

11. The canopy downdraft fan assembly as described in claim 9 further includes cargo nets depending from the vent support member proximate to the back end of the vent support member for storage.

12. A canopy downdraft fan assembly comprising:
support members adapted to be mounted to a prime mover;
a canopy having a top surface and a bottom surface, the support members connected to the bottom surface of the canopy;

an air flow generating assembly beneath and covered by the canopy, the air flow generating assembly comprising a fan support member connected to the bottom surface of the canopy, the fan support member comprising a rigid sheet of material having a front end, a back end, and a top surface, the rigid sheet of material configured to define a recess with an opening intermediate the front and back end, the opening spaced from the top surface, wherein a first plurality of fans are supported by the fan support member adjacent to the opening.

13. The canopy downdraft fan assembly as described in claim 12 wherein the fan support member further comprises recessed ports spaced apart and spaced relative to the top surface proximate to the front end of the rigid sheet of material, wherein the fan support member includes a second plurality of fans, each fan of the second plurality of fans being disposed in a respective one of the ports.

14. The canopy downdraft fan assembly as described in claim 12 wherein the air flow generating assembly also includes a chute or a plenum coupled to the first plurality of fans and having an open distal end, in communication with the opening, with adjustable slats spaced apart and disposed at the open distal end for directing air flow created by the first plurality of fans.

15. The canopy downdraft fan assembly as described in claim 12 wherein the first plurality of fans comprises a pair of axial fans coupled end to end.

16. The canopy downdraft fan assembly as described in claim 13 and a vent support member connected to and depending from the fan support member, the vent support member having vents spaced apart and in flow communication with each fan of the second plurality of fans.

* * * * *